United States Patent Office 2,906,687
Patented Sept. 29, 1959

2,906,687
METHOD OF OXIDIZING ASPHALTS

Joseph C. Roediger, Westfield, and Kenneth G. Morris, Cranford, N.J., assignors to Esso Research and Engineering Company, a corporation of Delaware No Drawing. Application October 24, 1957
Serial No. 692,040

6 Claims. (Cl. 208—5)

The present invention concerns an improved process for air-blowing petroleum asphalts. More particularly, the present invention relates to an improved process for oxidizing residual petroleum stocks in the presence of a phosphorus-containing catalyst. Still more particularly, the present invention relates to air-blowing asphalt in the presence of a liquid, readily dispersible phosphorus-containing oxidation catalyst.

The production of oxidized asphalts by blowing air through a petroleum residue or straight run asphalt at elevated temperatures is well known in the art of petroleum refining. It has been established that such a procedure has a decided effect upon the physical properties of the asphalt. In general, this technique serves to increase the hardness, softening point, pliability, and weathering resistance of an asphalt and decreases its ductility and susceptibility to changes in temperature. Oxidized asphalts show better pliability than straight reduced products, when both are of equal hardness. It will be noted that the hardness of a straight run asphalt may be greatly increased by extensive steam or vacuum distillation of the asphalt, but the resulting product in this instance is more susceptible to temperature than an air-blown asphalt. The air-blowing technique, in comparison with the vacuum distillation method, is capable of producing an asphaltic product of greater pliability but of the same hardness as an asphaltic product produced by vacuum distillation of the same straight run asphalt. As a result of their very desirable hardness, pliability and weathering resistance qualities, oxidized asphalts have become very popular in the production of roofing asphalts, protective coatings, electrical insulating compositions, moulded articles, and the like.

In connection with the conventional process of air-blowing petroleum asphalts, it has further been found that certain materials may be added to the asphalt being processed which will further modify the physical properties of the final product. For example, it has been established that compounds such as ferric chloride and oxides of phosphorus make possible the production of air-blown asphalts having even greater softening points for a given penetration, or better susceptibility to temperature, than is possible by air-blowing alone. The use of certain of these materials also reduces the period of time usually required in an air-blowing operation.

Modifiers for air-blown asphalts, called "oxidation catalysts" in the art, include $FeCl_3$, $ZnCl_2$, and particularly phosphorus compounds, such as $P_2O_5$ or stable phosphorus sulfides.

An important problem, however, arises in that the addition of these solid catalysts is accompanied by severe mixing and settling problems. Incomplete utilization of the solid additives frequently results because the solid settles to the bottom of the air-blowing vessel. Furthermore, reaction products between the catalyst and the asphalt and oxygen form on the surface of each particle and retard further utilization of the inner mass of the catalyst, such as $P_2O_5$. This problem cannot be adequately solved by the use of solvents. Thus, if water is employed as a solubilizer for the oxidation catalyst, the $H_3PO_4$ or the $H_3PO_4$ solution is not as effective as $P_2O_5$ would be alone; furthermore, it is highly corrosive and foaming is encountered since the asphalt is always at a temperature of 400° F. or higher during addition before air-blowing. Organic solvents, on the other hand, are volatilized and flashed off under these conditions and are likewise unsuitable. $P_2O_5$ is not soluble in heavy oils contiguous with the asphalt. For example, a heavy distillate oil (Roxtone 180) having a viscosity of 178 SSU at 210° F. was heated with $P_2O_5$ for 4.5 hours at 300° F. without noticeable signs of solubility. Furthermore, solubilization was not attained under similar conditions using a heavy aromatic oil (900X Phenol Extract) which has a viscosity of 400 SSU at 210° F.

Accordingly, it is an object of the present invention to provide an improved method for producing asphalts of superior properties. It is a still further object of the present invention to provide a novel reaction modifier adapted for air-blowing asphaltic compositions. Other and further objects and advantages of the present invention will become more apparent hereinafter.

It has now been found that particularly excellent asphalt oxidation reaction modifiers may be prepared by reacting certain oxygenated organic compounds with conventional asphalt oxidation catalysts, in particular $P_2O_5$. The latter may be reacted at elevated temperatures of 100° to 400° F., preferably 200° F., with a fatty acid or polyol of the class containing one or more hydroxyl groups or olefinic double bonds. These materials preferably should boil above about 300° F. and may include such compounds and classes as glycerides, hydroxy stearic acid, linseed oil, oleic acid, tall oil and similar compositions. However, of marked superior oxidation modification characteristic is the reaction product of $P_2O_5$ and oxo alcohol bottoms. "Oxo bottoms" is a synthesis product derived from the reaction between olefins, carbon monoxide and hydrogen in the presence of a cobalt carbonylation catalyst. The carbonylation, or oxo reaction, as it is commonly called is well known in the art as a method of preparing alcohols from olefins, the former having one more carbon atom than the olefin from which it is derived. It is a two-stage synthesis wherein, in the first stage, olefin, CO, $H_2$ and a cobalt catalyst are reacted at pressures of about 2000 to 4000 p.s.i.g. and temperatures of 275° to 375° F. to form an aldehyde product containing one more carbon atom than the parent olefin, and the aldehyde product is subsequently hydrogenated to form the corresponding alcohol. The process is described in U.S. Patent 2,327,066 to Roelen; 2,504,682 to Harlan and in many subsequent patents. It is the still pot residues after the distillation of the alcohol fraction, commonly referred to as "oxo bottoms" that are the solvent oil fortifying components of the present invention. In the carbonylation of a heptene fraction obtained from propylene-butylene copolymerization, for example, the bottoms represent about 15 to 30% of the crude alcohol charged to the distillation zone. The bottoms consist primarily of highly branched chain $C_{16}$ alcohols, $C_{24}$ acetals, $C_{16}$ ethers, both saturated and unsaturated, and minor amounts of other oxygenated compounds, such as aldols, esters and the like. A typical analysis of the composition obtained from carbonylation of a heptene polymer fraction is as follows:

| | Percent (weight) |
|---|---|
| $C_{16}$ alcohols | 48.6 |
| $C_{24}$ acetals | 19.1 |
| $C_{16}$ ethers | 17.4 |
| $C_{22}$ esters | 14.7 |
| $C_{16}$ ketones/aldehydes | 0.2 |

Inspection of the product was as follows:

| | |
|---|---|
| Hydroxyl No. | 95 |
| Free carbonyl No. | 0.5 |
| Combined carbonyl No. | 29 |
| Saponification No. | 21 |
| Gravity, °A.P.I. | 33.3 |
| Acid No. | 0.2 |

Though for any particular olefin fraction being carbonylated the magnitude of these constituents may vary, the relative proportions generally remain fairly constant. Thus, a propylene fraction, a heptene fraction, a $C_9^=$ and a $C_{12}^=$ fraction may be carbonylated and the bottoms employed. The constituents of oxo bottoms are all characterized by being highly branch chained, even though relatively straight chain olefins are originally carbonylated. This arises out of the isomerizing characteristics of the cobalt carbonyl catalyst and the fact that the addition of the

group may be to either one of the double bonds.

A sample of a $C_8$ oxo bottoms has the following Engler distillation at 10 mm.

| Percent distilled: | Temperature, °F. |
|---|---|
| I.B.P. | 184 |
| 5 | 220 |
| 10 | 220 |
| 20 | 234 |
| 30 | 253 |
| 40 | 270 |
| 50 | 308 |
| 60 | 322 |
| 70 | 340 |
| 80 | 370 |
| 90 | 435 |
| 95 | 486 |
| F.B.P. (98%) | 503 |

In accordance with a preferred modification of the invention, therefore, oxo bottoms are reacted at a temperature of 80° to 270° F., but preferably above 210° F. where the reaction proceeds at a reasonably rapid rate. The amount of $P_2O_5$ that can be incorporated in oxo bottoms can be approximated from the hydroxyl number of the oxo bottoms. Hydroxyl number is reported as mg. KOH/gram sample. Since 1 mole of KOH reacts with 1 mole of hydroxyl compounds and 1 mole of $P_2O_5$ reacts with 3 moles of hydroxyl compounds, the amount of $P_2O_5$ reactable with oxo bottoms of a given hydroxyl number can be approximated as follows:

EXAMPLE

Hydroxyl number = 240 mg. KOH/gram sample.
M.W. of KOH = 56.104 ÷ 1 = 56.104 g. KOH—reacts with 1 mole OH compounds.
M.W. of $P_2O_5$ = 142.054 ÷ 3 = 47.351 g. $P_2O_5$—reacts with 1 mole OH compounds.
Therefore, $$240 \times \frac{47.351}{56.104} = 202.5 \text{ mg. } P_2O_5$$

reacts with each gram of the 240 hydroxyl number bottoms.

The finished product is a low viscosity tan to brown liquid at room temperature.

In order to describe the present invention, it is desirable to describe a conventional process for air-blowing a petroleum asphalt. Generally speaking, a straight-run petroleum asphalt stock having a Furol viscosity of 100 to 600 secs. at 210° F. is suitable for the production of an oxidized asphalt. It must have a low percentage of wax, preferably below 5%. The asphalt stock may be paraffinic, mixed base, or naphthenic type. After oxidation it should have a high penetration for a given softening point. It must be ductile and pliable and resistant to weathering.

The asphalt is heated to a temperature of about 300° F. to about 500° F., but preferably not over 520° F., and is passed to a reaction zone or vessel where it is contacted with streams of air that are generally blown up through the asphalt at rates of about 10 to 60 cu. ft. per minute per ton of asphalt charge. The charge is maintained at a temperature about 50° F. below its flash point. This air-blowing operation is continued until the asphalt charge has reached a desired degree of hardness, penetration, etc. If desired, air-blowing may be carried out under pressure, and supplementary agitation may be provided. Periods of about 12 to 24 hours are generally required for this purpose, though longer periods may be used. In addition, this process may be carried out either batchwise or continuously, depending upon the equipment available.

Following the air-blowing operation, the oxidized asphalt is removed from the air-blowing zone or reactor and is pumped to any desired location. In some instances, it may be cut back with diluents such as petroleum naphtha, kerosene, fuel oil, etc. The preparation of cutback asphalts is well known in the art, and it is felt that a detailed description of such an operation is therefore not required here.

When $P_2O_5$ has been added in the past to an asphalt passing through an air-blowing process, the agent has been conventionally added in the form of a solid to the asphalt directly within the oxidizing zone. Nothing other than the turbulent condition normally existing within the oxidizing zone has been relied upon to disperse the agent throughout the reaction mixture.

The fluid reaction modifier of the present invention may be added to the hot asphalt either within the reactor or within the transfer line through which the asphalt flows to the reactor. It is preferred that it be added to the asphalt within the transfer line but either method may be used. Better contact and mixing is generally obtained by addition of the catalyst to the transfer line. Usually 0.5 to 5.0% by weight is all the catalyst that need be added. The liquid modifier is preferably added at its ambient temperature (80°–100° F.) by pumping it into the transfer line as charging of the reactor progresses and at a rate calculated to obtain uniform mixing. Agitation may additionally be obtained by air-blowing. Blowing time may vary somewhat, depending upon the nature of the asphalt stock, the design of the apparatus, the relationship of penetration and softening point desired, etc.

The following example serves to better describe the present process and to illustrate the benefits that are derived therefrom.

EXAMPLE

Portions of a straight run asphalt were oxidized under substantially identical conditions: (1) in the absence of a reaction modifier, (2) in the presence of $P_2O_5$, (3) in the presence of oxo bottoms, and (4) in the presence of the reaction product of $P_2O_5$ and oxo bottoms. The data clearly show that the reaction product of these two components yields an asphalt after air-blowing which has improved susceptibility characteristics, better low temperature properties, such as higher impact resistance and increased pliability, and improved softening point-penetration relationship over $P_2O_5$ alone or oxo bottoms alone. Apparently, a synergistic effect results when the $P_2O_5$ is combined with the oxo bottoms.

Under the same reaction conditions, it is to be noted that polyphosphoric acid, a syrupy liquid, is not nearly as effective an oxidation catalyst, nor produces as improved a product.

In the experiments, the air blowings were performed using Lagunillas flux (300 Furol v./210° F.).

*Air blown asphalt coatings prepared with and without product modifiers*

| Experiment No. | A | B | C | D | E |
|---|---|---|---|---|---|
| Modifier, weight percent: | | | | | |
| $P_2O_5$ | | 0.5 | | | |
| $C_8$ oxo bottoms | | | 2.5 | | |
| $P_2O_5$-oxo bottoms compound | | | | [1] 2.5 | |
| Polyphosphoric acid | | | | | 0.5 |
| Coating product: | | | | | |
| Softening point, °F | 218 | 218 | 219 | [2] 224(219) | 230(220) |
| Pen., 77° F./100 g./5" | 18 | 28 | 17 | 30(31) | 24(26) |
| Pen., 32° F./200 g./60" | 11 | 17 | 10 | 20 | 16 |
| Ductility, 77° F., cm | 2.5 | 3 | 2.5 | 3 | 3 |
| Impact, 40° F., in | 2.5 | 2.5 | 2.5 | 5 | 1.5 |
| Pliability, 0° F., degrees | 10 | 24 | 7 | 85 | 33 |
| Air-blowing conditions: | | | | | |
| Temperature, °F | 470 | 470 | 470 | 470 | 470 |
| Time, minutes | 295 | 323 | 605 | 195 | 425 |

[1] Contains about 0.5% $P_2O_5$.
[2] Parenthetical values are interpolated values adjusted to the same softening point to show differences in penetration.

As demonstrated in the example above, the use of the modifier of the invention makes possible the production of oxidized asphalt that is beyond the reach of air-blowing with a comparable amount of conventional catalyst, even when the latter is carried out for a much longer period of time. Thus, the table clearly indicates that for the same softening point, the additive of the invention provides a higher desirable penetration effect, as well as impact resistance and pliability.

It will be appreciated that the present process may be modified in various respects without departing from the scope or spirit of the invention. For example, asphalts derived from cracking operations may be processed in a manner similar to straight run asphalts. In addition, the present oxidation process may be combined with distillation steps to produce asphalts of a wide combination of properties, or residues that have been distilled further than desired may be blended with heavy petroleum distillates before oxidation.

Furthermore, oxo bottoms may be reacted with analogous asphalt oxidation catalysts, such as $P_2O_5$, $P_2S_5$, $P_2S_3$ and the like.

What is claimed is:

1. In the oxidation of a petroleum asphalt by air-blowing the asphalt in the presence of a phosphorus-containing oxidation catalyst, the improvement which comprises air-blowing said asphalt in the presence of a catalytic amount of the reaction product of a compound selected from the class consisting of oxides and sulfides of phosphorus and an oxygenated hydrocarbonaceous material having at least one substituent from the class consisting of carboxyl groups, hydroxyl groups, carbonyl groups and olefinic double bonds, boiling above about 300° F.

2. The process of claim 1 wherein said oxygenated hydrocarbonaceous materials are unsaturated organic acids having from 12 to 22 carbon atoms.

3. The process of claim 1 wherein said oxygenated hydrocarbonaceous materials are polyhydroxy compounds.

4. An improved process for oxidizing asphalts which comprises air-blowing an asphalt at a temperature in the range of from about 300° to about 520° F. in the presence of from about 0.5 to about 5.0% by weight of the reaction product of an oxide of phosphorus and a mixture of oxygenated organic compounds produced as still bottoms of the oxo reaction, wherein $H_2$, CO and an olefin having 2 to 15 carbon atoms are contacted at elevated temperatures and pressures in the presence of a carbonylation catalyst to produce an aldehyde product which is subsequently hydrogenated to the alcohol product, and thereafter removing the major portion of the $C_3$ to $C_{16}$ alcohol component by distillation, leaving behind said still bottoms product.

5. The process of claim 4 wherein $P_2O_5$ is reacted with said still bottoms at a temperature of about 100° to 400° F.

6. The process of claim 1 wherein said oxygenated hydrocarbonaceous materials are hydroxy organic carboxylic acids having from 12 to 22 carbon atoms.

References Cited in the file of this patent

UNITED STATES PATENTS

| 2,450,756 | Hoiberg | Oct. 5, 1948 |
| 2,758,069 | Whitney | Aug. 7, 1956 |